United States Patent
Liu et al.

(10) Patent No.: US 9,384,588 B2
(45) Date of Patent: Jul. 5, 2016

(54) VIDEO PLAYING METHOD AND SYSTEM BASED ON AUGMENTED REALITY TECHNOLOGY AND MOBILE TERMINAL

(71) Applicant: Chengdu Idealsee Technology Co., Ltd., Chengdu (CN)

(72) Inventors: Yinqiu Liu, Chengdu (CN); Xinyu Li, Chengdu (CN); Haitao Song, Chengdu (CN)

(73) Assignee: Chengdu Idealsee Technology Co., Ltd. (CN)

( * ) Notice: Subject to any disclaimer, the term of this patent is extended or adjusted under 35 U.S.C. 154(b) by 0 days.

(21) Appl. No.: 14/418,167

(22) PCT Filed: Jul. 30, 2013

(86) PCT No.: PCT/CN2013/080422
§ 371 (c)(1),
(2) Date: Jan. 29, 2015

(87) PCT Pub. No.: WO2014/019498
PCT Pub. Date: Feb. 6, 2014

(65) Prior Publication Data
US 2015/0193970 A1    Jul. 9, 2015

(30) Foreign Application Priority Data

Aug. 1, 2012 (CN) .......................... 2012 1 0271482

(51) Int. Cl.
*G06T 17/00* (2006.01)
*G06F 3/01* (2006.01)
(Continued)

(52) U.S. Cl.
CPC ............... *G06T 17/00* (2013.01); *G06F 3/011* (2013.01); *G06T 11/00* (2013.01); *G06T 11/001* (2013.01); *G06T 19/006* (2013.01); *H04N 5/272* (2013.01)

(58) Field of Classification Search
USPC ................................................. 345/419, 420
See application file for complete search history.

(56) References Cited

U.S. PATENT DOCUMENTS 8,753,508 B2 *  6/2014  Domoulin ................. 210/221.1
8,861,868 B2 * 10/2014  Shechtman ........... G06K 9/4652
                                                          382/218
(Continued)

FOREIGN PATENT DOCUMENTS

CN         101923791 A        12/2010
CN         101976463 A         2/2011
(Continued)

OTHER PUBLICATIONS

International Search Report for Application No. PCT/CN2013/080422 dated Oct. 17, 2013.

*Primary Examiner* — Kimbinh T Nguyen
(74) *Attorney, Agent, or Firm* — Lerner, David, Littenberg, Krumholz & Mentlik, LLP

(57) ABSTRACT

Disclosed is a video playing method based on augmented reality technology. In combination with augmented reality technology, a rectangular plane 3D model which completely covers a target picture in a current scene image is drawn, and at the same time, after a video file related to the target picture is separated into an audio stream and a video stream, a video image frame in the video stream is taken as a texture and is mapped to the 3D model frame by frame, and graphic rendering is performed; and finally, a scene image captured by a video camera and the rendered 3D model are fused and output, and the audio stream data is output synchronously. Correspondingly, also disclosed are a video playing system based on augmented reality technology and mobile terminal. The picture information in newspapers and periodicals, magazines and other print media can be easily converted into video information, and the video completely fits the picture in the spatial position, so that a user obtains a new audio-visual experience of combining emotion with scenery; and newspapers and periodicals, magazines and other paper media can also realize diversified propagation of information by virtue of the technology of the present invention, and provide a precise fast video push service.

9 Claims, 4 Drawing Sheets

(51) Int. Cl.
*G06T 11/00* (2006.01)
*G06T 19/00* (2011.01)
*H04N 5/272* (2006.01)

(56) References Cited

U.S. PATENT DOCUMENTS

| | | | | |
|---|---|---|---|---|
| 2006/0024041 A1* | 2/2006 | Lou | ............ | G06T 7/0018 396/213 |
| 2009/0284601 A1* | 11/2009 | Eledath | ............ | G06K 9/209 348/157 |
| 2010/0309226 A1* | 12/2010 | Quack | ............ | G06F 17/30244 345/634 |
| 2012/0034092 A1 | 2/2012 | Jakimov et al. | | |
| 2012/0082387 A1 | 4/2012 | Zhang et al. | | |
| 2012/0122491 A1* | 5/2012 | Kim | ............ | H04L 67/22 455/456.3 |
| 2012/0180084 A1* | 7/2012 | Huang | ............ | G06T 19/006 725/32 |
| 2013/0307875 A1* | 11/2013 | Anderson | ............ | G06T 19/006 345/633 |
| 2014/0253743 A1* | 9/2014 | Loxam | ............ | H04N 5/232 348/207.1 |

FOREIGN PATENT DOCUMENTS

| | | |
|---|---|---|
| CN | 102110379 A | 6/2011 |
| CN | 102196245 | 9/2011 |
| CN | 102411854 A | 4/2012 |
| CN | 102821323 A | 12/2012 |
| EP | 2299726 | 3/2011 |
| JP | 2010530998 A | 9/2010 |
| WO | 2008109567 A2 | 9/2008 |
| WO | 2012167134 A1 | 12/2012 |

* cited by examiner

VIDEO PLAYING METHOD AND SYSTEM BASED ON AUGMENTED REALITY TECHNOLOGY AND MOBILE TERMINAL

CROSS REFERENCE TO RELATED APPLICATIONS

The present application is a national phase entry under 35 U.S.C. §371 of International Application No. PCT/CN2013/080422 filed Jul. 30, 2013, published in Chinese, which claims the benefit of and priority to CN Patent Application No. 201210271482.5, filed Aug. 1, 2012, the entire disclosures of which are hereby incorporated by reference herein.

FIELD OF THE INVENTION

The present disclosure relates to mobile augmented reality field, and particularly to a method and a system for playing video based on augmented reality technology, and a mobile terminal.

BACKGROUND OF THE INVENTION

Mobile augmented reality, i.e., augmented reality based on mobile terminal, is a research direction combining augmented reality technology and mobile computing technology. Mobile augmented reality, which gets more and more attention, has become one of the hotspots in human-computer interaction field in recent years. Mobile augmented reality is the same as traditional augmented reality in essence, that is, fusing virtual information with real environment in a real-time and seamless manner by virtue of computer graphics technology and visualization technology in a scene when real environment is presented, and supplementing and augmenting real scene with virtual information. At the same time, mobile augmented reality can be combined with mobile terminal platforms, whereby the mobility of augmented reality technology can be played to the largest extent and a new sensory experience and interactive mode completely distinguishing from traditional personal computer platforms can be provided to users.

However, in the current augmented reality system, the virtual three-dimensional model (3D model) is directly superposed on real scene, and the application scope thereof is limited.

In addition, in the current mobile terminal, videos are played by general video player software. For example, when users need to watch videos searched from the network on their mobile phones, the videos can only be searched from the network and then played by general player software. Traditional video playing manner is relatively outdated and lack of attraction, and thus cannot provide a new sensory experience and interactive mode completely distinguishing from traditional personal computer platforms to users.

SUMMARY OF THE INVENTION

The purpose of the present disclosure is to provide a method and a system for playing video based on augmented reality technology, and a mobile terminal, whereby the application scope of augmented reality technology can be expanded and the problem of outdated and lack of attraction in traditional video playing manner can be solved. According to the present disclosure, the picture information in newspapers and periodicals, magazines and other print media can be easily converted into video information by the system disclosed herein, and the video completely fits the picture in the spatial position, so that a user can obtain a new audio-visual experience of combining emotion with scenery.

To achieve the above purpose, the present disclosure provides a method for playing a video based on augmented reality technology, comprising:

searching, according to a current scene image captured by a video camera, a reference image matching with a target picture in the current scene image and a video file corresponding to said reference image in an image database;

performing audio-video split on and decoding to the video file corresponding to said reference image, in order to obtain a video image frame sequence and an audio data;

registering the current scene image captured by a video camera with the reference image, calculating a posture of the video camera to obtain a homography matrix, and obtaining a rectangular plane 3D model which completely covers the target picture in the current scene image according to said homography matrix;

mapping a video image frame, as a texture, in said video image frame sequence to said 3D model frame by frame, and performing graphic rendering; and fusing the current scene image captured by the video camera with the rendered 3D model, outputting and displaying the fusing result, and outputting said audio data synchronously.

Preferably, registering the current scene image captured by a video camera and reference image, and calculating a posture of the video camera to obtain a homography matrix may be:

registering the current scene image captured by the video camera with the reference image in a real-time and continuous manner, and calculating a posture of the video camera, in order to obtain the homography matrix.

Preferably, registering the current scene image captured by a video camera and reference image, and calculating a posture of the video camera to obtain a homography matrix also may be:

registering the current scene image captured by the video camera with the reference image to obtain an initial homography matrix; and performing optical flow tracking on the target picture according to image feature points of successful image registration, the initial homography matrix and the current scene image captured by the video camera in real time, in order to obtain the homography matrix through tracking algorithm.

Preferably, when performing optical flow tracking on the target picture, said method further comprises:

determining whether the optical flow tracking on target picture fails, if yes, performing feature point detection and image registration once again on the current scene image captured by the video camera.

Preferably, searching, according to a current scene image captured by a video camera, a reference image matching with a target picture in the current scene image and a video file corresponding to said reference image in an image database further comprises:

capturing, by the video camera, the current scene image containing the target picture;

performing feature detection on the current scene image captured by the video camera, extracting image feature points thereof, and describing said image feature points, so as to obtain feature description data of a whole image; and searching an image in an image database according to the feature description data of the current scene image, so as to obtain a reference image matching with the target picture in the current scene image and a video file corresponding to said reference image.

Correspondingly, the present disclosure further provides a system for playing a video based on augmented reality technology, comprising a video camera module, an image feature extracting module, an image searching module, an image registering module, an audio-video splitting and decoding module, an graphic rendering module and an audio-video output module, wherein said video camera module is used for capturing a current scene image containing a target picture;

wherein said image feature extracting module is used for performing feature point detection on the current scene image captured by the video camera module, extracting image feature points, and describing said image feature points, so as to obtain feature description data of the current scene image;

wherein said image searching module is used for receiving the feature description data of the current scene image from said image feature extracting module, searching in image database, transmitting the feature description data of a reference image matched therewith to the image registering module, and transmitting an Uniform Resource Identifier (URI) of a video resource corresponding to the matched reference image to the audio-video splitting and decoding module;

wherein said image registering module is used for registering the current scene image captured by the video camera module with the reference image according to feature description data of the reference image returned by the image searching module and the feature description data of the current scene image extracted by said image feature extracting module, so as to obtain a homography matrix;

wherein said audio-video splitting and decoding module is used for finding corresponding video file according to the URI of a video resource obtained by the image searching module, performing audio-video split on and decoding to said video file, in order to obtain a video image frame sequence and an audio data, and transmitting said video image frame sequence to the graphic rendering module and said audio data to the audio-video output module;

wherein said graphic rendering module is used for drawing a rectangular plane 3D model which completely covers the target picture in the current scene image according to the homography matrix calculated by the image registering module, and mapping a video image frame, as a texture, extracted by said audio-video splitting and decoding module to said 3D model frame by frame, thereby graphic rendering being performed; and wherein said audio-video output module is used for fusing the current scene image captured by the video camera module with the 3D model rendered by the graphic rendering module, outputting and displaying the fusing result, and outputting said audio data synchronously.

Preferably, said image registering module registers the current scene image captured by the video camera module with the reference image in a real-time and continuous manner, and calculates a posture of the video camera module, in order to obtain the homography matrix.

Preferably, said system further comprises a tracking module connected between said image registering module and said graphic rendering module, said tracking module being also connected with the video camera module, and wherein said tracking module is used for performing optical flow tracking on the target picture of the current scene image captured by the video camera module and calculating the homography matrix, after the target picture of the current scene image captured by the video camera module is successfully matched with the reference image.

Preferably, said tracking module is also used for commanding image feature extracting module to detect feature points of the current scene image captured by the video camera module once again and commanding the image registering module to perform image registration once again when tracking on target picture fails.

Correspondingly, the present disclosure further provides a mobile terminal, which comprises a video playing system based on augmented reality technology as mentioned above.

Compared with the prior art, the present disclosure can achieve the following beneficial effects.

1. The video can be superposed on real scene. For example, the picture information in newspapers and periodicals, magazines and other print media can be easily converted into video information by the system disclosed herein, and the video completely fits the picture in the spatial position, so that a user can obtain a new audio-visual experience of combining emotion with scenery.

2. A precise fast video push service can be provided.

3. An entirely new interactive mode and an audio-visual effect with science-fictional style can be provided to mobile network users.

BRIEF DESCRIPTION OF THE DRAWINGS

The drawings necessary for explaining the embodiments or the prior art are introduced hereinafter to interpret the technical solutions of the embodiments of the present disclosure or the prior art more clearly. Apparently, the drawings described hereinafter are only embodiments of the present disclosure, and other drawings can be obtained by a person skilled in the art according to these drawings without creative work.

DETAILED DESCRIPTION OF THE EMBODIMENTS

The technical solutions of the embodiments of the present disclosure are described hereinafter in a clear and complete manner in combination with the drawings of the embodiments. It should be noted that, the embodiments described herein are only part of the embodiments of the present disclosure, rather than all of the embodiments. All other embodiments obtained by a person skilled in the art based on the embodiments disclosed herein without creative work shall fall within the protection scope of the present disclosure.

The present disclosure relates to expanded application of augment reality technology, and aims to solve the problem of outdated and lack of attraction in traditional video playing manner. According to the present disclosure, the picture information in newspapers and periodicals, magazines and other print media can be easily converted into video information by the system disclosed herein, and the video completely fits the picture in the spatial position, so that a user can obtain a new audio-visual experience of combining emotion with scenery. Therefore, the technical core of the present disclosure comprises how to superpose video on a certain image area in real scene.

The embodiments of the present disclosure will be described in detail hereinafter in combination with the drawings.

Embodiment 1

Figure 1:
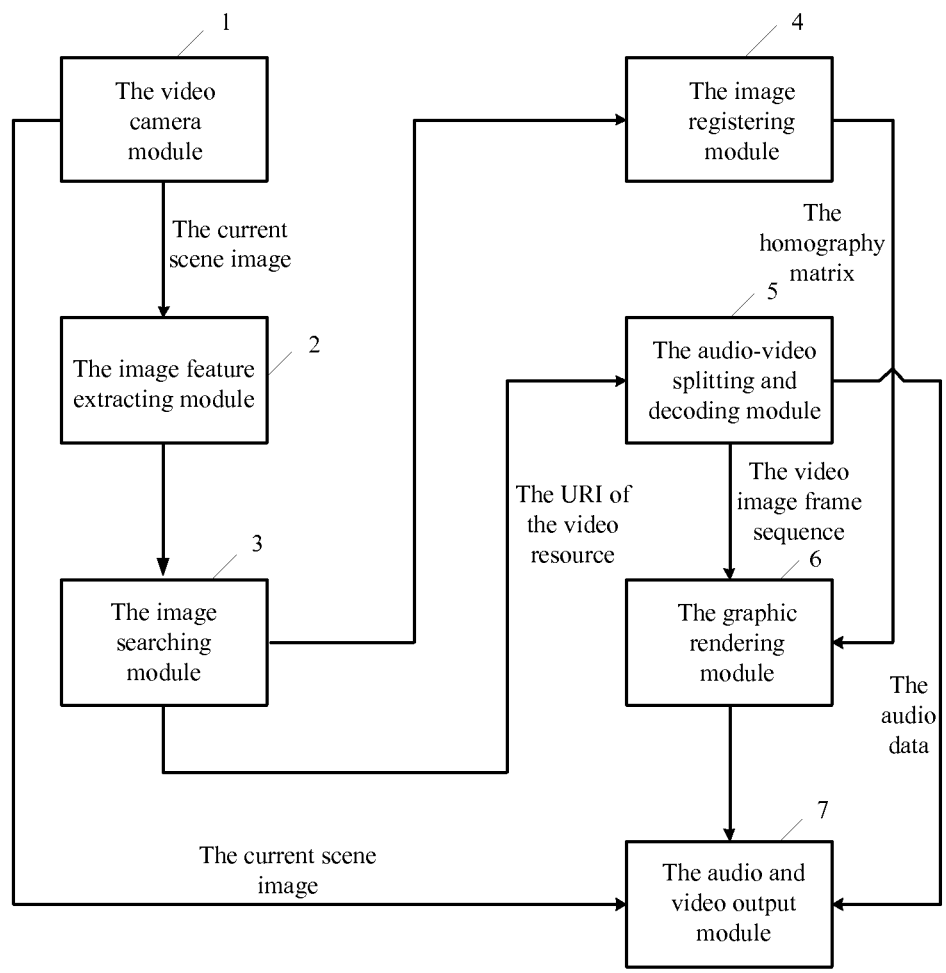
FIG. 1 is a structural diagram of a system for playing video based on augmented reality technology according to embodiment 1 of the present disclosure.

FIG. 1 is a structural diagram of a system for playing video based on augmented reality technology according to embodiment 1 of the present disclosure. The video playing system comprises a video camera module 1 (comprising a video camera of mobile terminal), an image feature extracting module 2, an image searching module 3, an image registering module 4, an audio-video splitting and decoding module 5, an graphic rendering module 6, and an audio-video output module 7.

The video camera module 1 is used for capturing a current scene image containing a target picture. The video camera module 1, connected with the image feature extracting module 2 and the audio-video output module 7 respectively, is used for transmitting the captured image to the image feature extracting module 2 for extracting the feature thereof, and transmitting the captured image to the audio-video output module 7 for fusing, outputting and displaying.

The image feature extracting module 2 is used for performing feature point detection on current scene image captured by the video camera module 1, extracting image feature points thereof, and describing said image feature points, so as to obtain feature description data of the current scene image and transmit said feature description data to the image searching module 3.

The image searching module 3 is used for receiving the feature description data of the current scene image transmitted from said image feature extracting module 2, searching a reference image matching with it in image database of a server, transmitting the feature description data of matched reference image to the image registering module 4, and transmitting an Uniform Resource Identifier (URI) of a video resource corresponding to the matched reference image to the audio-video splitting and decoding module 5.

The image registering module 4 is used for registering the current scene image captured by the video camera module with the reference image in a real-time and continuous manner according to the feature description data of the reference image returned by the image searching module 3 and the feature description data of the current scene image extracted by said image feature extracting module 2, calculating a posture of video camera to obtain a homography matrix, and transmitting the homography matrix to the graphic rendering module 6.

The audio-video splitting and decoding module 5 is used for finding the corresponding video file (the related video of the image captured by the video camera) according to the URI of the video resource obtained by the image searching module 3, performing audio-video split on and decoding to said video file to obtain a video image frame sequence (video stream) and an audio data (audio stream), extracting video image frame one by one from the video image frame sequence (video stream), transmitting the video image frame to the graphic rendering module 6, and transmitting said audio data to the audio-video output module 7.

The graphic rendering module 6 is used for drawing a rectangular plane 3D model which completely covers the target picture in the current scene image according to the homography matrix calculated by the image registering module 4, and mapping the video image frame, as a texture, extracted by the audio-video splitting and decoding module to said 3D model frame by frame, which is updated in real-time, thereby graphic rendering being performed. The rectangular plane 3D model completely covering target picture includes the cases that the rectangular plane 3D model coincides with the target picture. For example, when the target picture is a rectangular, a rectangular plane 3D model which completely coincides with the target picture can be drawn. If the target picture is non-rectangular, a rectangular plane 3D model which completely covers the target picture can be drawn.

The audio-video output module 7 is used for fusing, outputting and displaying the current scene image captured by the video camera module 1 and a 3D model rendered by the graphic rendering module 6, and outputting audio data synchronously.

After the video file is separated into an audio stream and a video stream, the data packets thereof need to be segmented, so that the synchronization between audio data and video image frame can be realized. The video data packets form a chain list according to the order of the timestamp thereof, and thus an ordered queue is formed. Each of the data packets is decoded and the images thereof are extracted, so that the video image frame sequence is obtained and the image sequence is output under the control of the timestamp. When the video image frame is mapped to the 3D model by the graphic rendering module as a texture, since the output images change with time in an ordered manner, the texture of the 3D model changes accordingly, whereby the video is played. In addition, the audio stream is segmented into data packets, and the audio data packets are output according to the timestamp of the video data packets, so that audio and video are output synchronously.

In the present embodiment, during a video playing procedure, the image searching module 3 searches the reference image matching with the image captured by the video camera module only once in principle, so as to find the reference image and the video resource corresponding to the reference image. However, the video camera module 1 captures the scene images continuously, the image feature extracting module 2 also extracts the features of the scene images captured by the video camera module continuously, and the image registering module 4 registers the current scene image captured by the video camera module 1 with the reference image in a real-time and continuous manner, and calculates a posture of video camera in real-time to obtain a homography matrix corresponding to the real-time posture of the video camera module 1 continuously. Therefore, the system of the present disclosure performs feature detection and registration on each frame picture captured by the video camera module 1, which would have a slightly negative effect on the speed thereof in practice.

Figure 5:
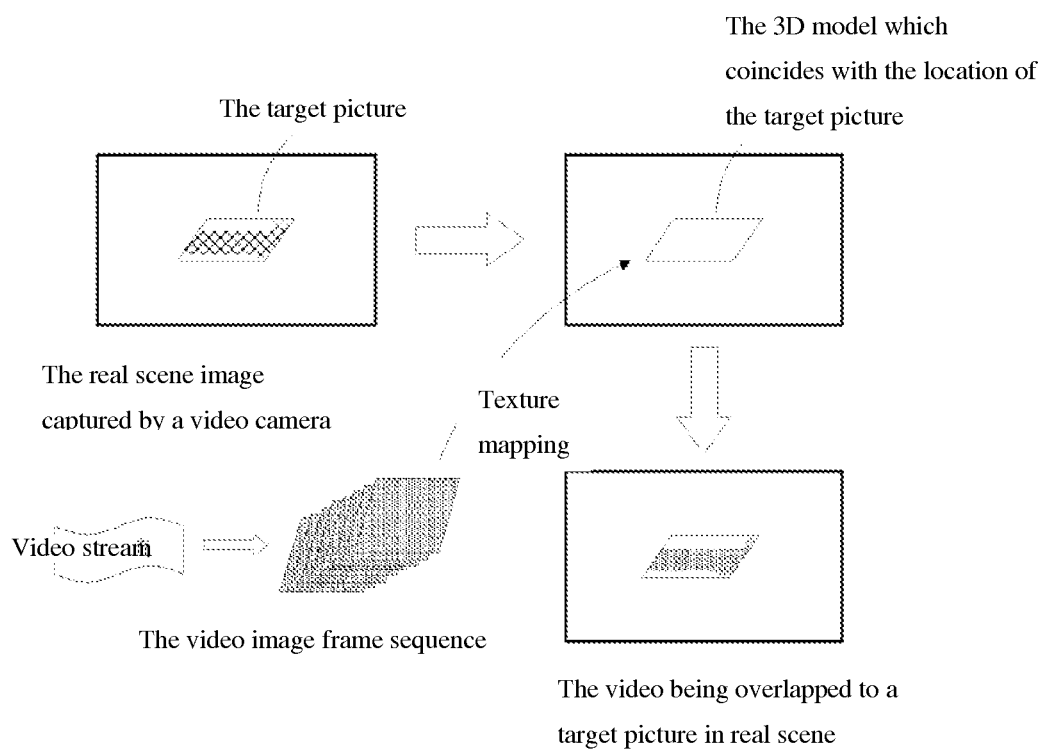
FIG. 5 schematically shows an effect of the embodiments of the present disclosure.

FIG. 5 schematically shows an effect of video being overlapped to a target picture in real scene according to the present embodiment. The current scene image captured by the video camera module is "the real scene image captured by the video camera" as shown in FIG. 5. The target picture contained in the real scene image is a rectangular picture, as shown in FIG. 5. A 3D model which coincides with the location of the target picture is drawn by the system of the present embodiment. The video file related to the target picture searched therein is separated and decoded, the video image frames are extracted from the video image frame sequence separated therein, and the video image frames, as texture, are mapped to the 3D model of the rectangular plane frame by frame and are updated in real-time. The images are rendered, and thus the video being overlapped to a target picture in real scene is realized. At the same time, the audio data separated from the video file are output synchronously according to the rendering progress of the video images.

Embodiment 2

Figure 2:
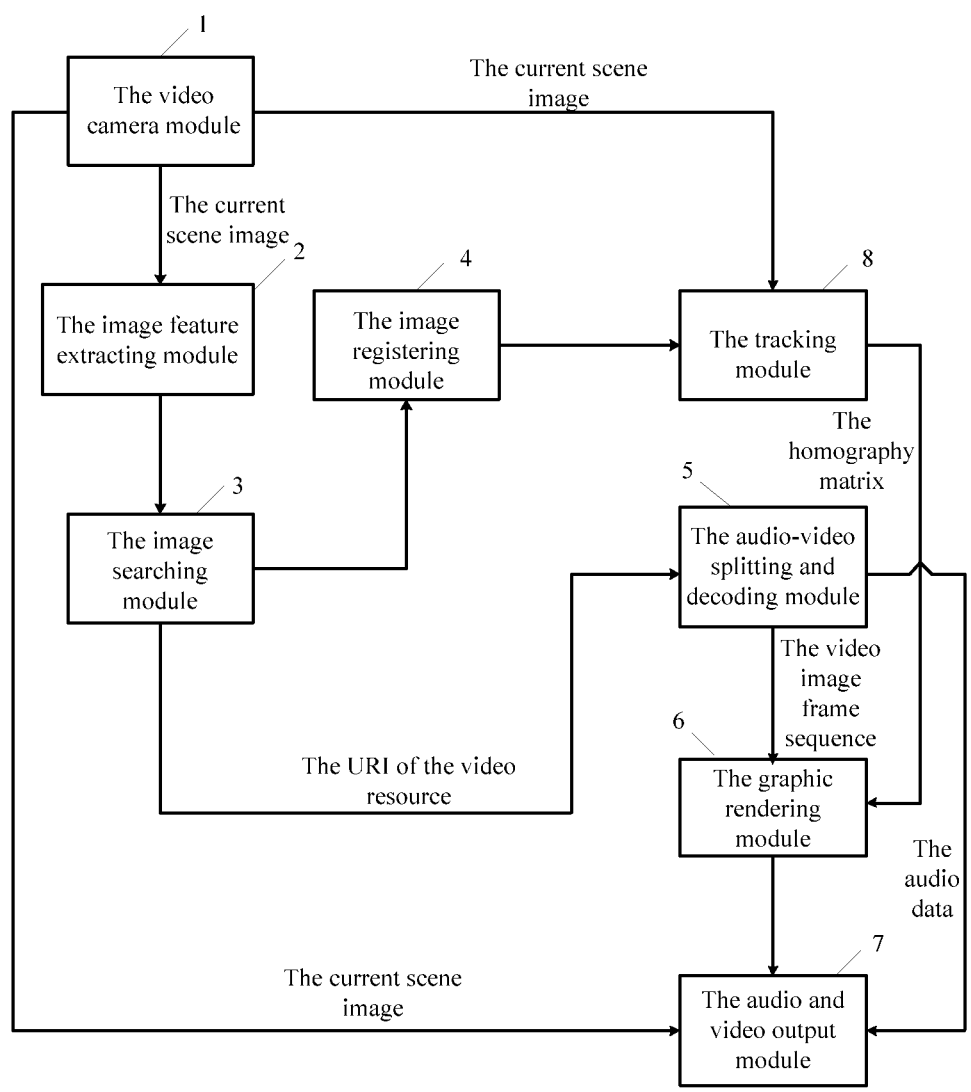
FIG. 2 is a structural diagram of a system for playing video based on augmented reality technology according to embodiment 2 of the present disclosure.

FIG. 2 is a structural diagram of a system for playing video based on augmented reality technology according to embodiment 2 of the present disclosure. The video playing system of the present embodiment is added with a tracking module 8 on the basis of the system of FIG. 1 (that is, embodiment 1), which is connected between the image registering module 4 and the graphic rendering module 6. In the present embodiment, the homography matrix calculated by the image registering module 4 is an initial homography matrix. The tracking module 8 is also connected with the video camera module 1. If the target picture of the current scene images captured by the video camera module 1 is matched with the reference image, the feature detection thereof would stop, i.e., the image feature extracting module 2 stop extracting the feature points of the images capture by the video camera module 1. The tracking module 8 is used for performing optical flow tracking on a target picture of a current scene image captured by the video camera module 1 to obtain the homography matrix through tracking algorithm.

The optical flow is the instantaneous velocity of the pixel motion of a moving object in space in the observing and imaging plane, whereby the corresponding relationship between the last frame and the current frame can be found according to the change of the pixels of the image sequence in time domain and the correlations between adjacent frames, and thus the moving information of the target objects between adjacent frames can be calculated. In the present embodiment, the image registering module 4 conveys the initial homography matrix calculated therein and the feature points need to be tracked to the tracking module 8. At the same time, the tracking module 8 receives the current scene image captured by the video camera module 1 in real-time, and performs tracking and calculating. The term "feature points need to be tracked" means the feature points of registered pictures during the image searching procedure.

To prevent unsuccessful tracking, preferably, the tracking module is also used for commanding image feature extracting module to detect feature points of a current scene image captured by the video camera once again and commanding the image registering module to perform image registration once again when tracking on target picture fails, so that the tracking can be performed once again. The failing of tracking can be determined as follows: calculate once again the matching degree of the feature points which are successfully tracked, and record the number of the feature points thereof; if the number of the well-matched feature points is below a threshold (which ranges generally from 5 to 20, and is preferably 10), the tracking fails.

According to the present embodiment, the system is added with the tracking module 8, the speed of the system is improved compared with embodiment 1 since feature detection and registration on each frame picture is not needed. In addition, the judder of the images due to the minor deviation of the calculation result of the homography matrix during the registration process can be avoided, so that the 3D model formed therein is more stable in terms of visual effect.

Embodiment 3

Figure 3:
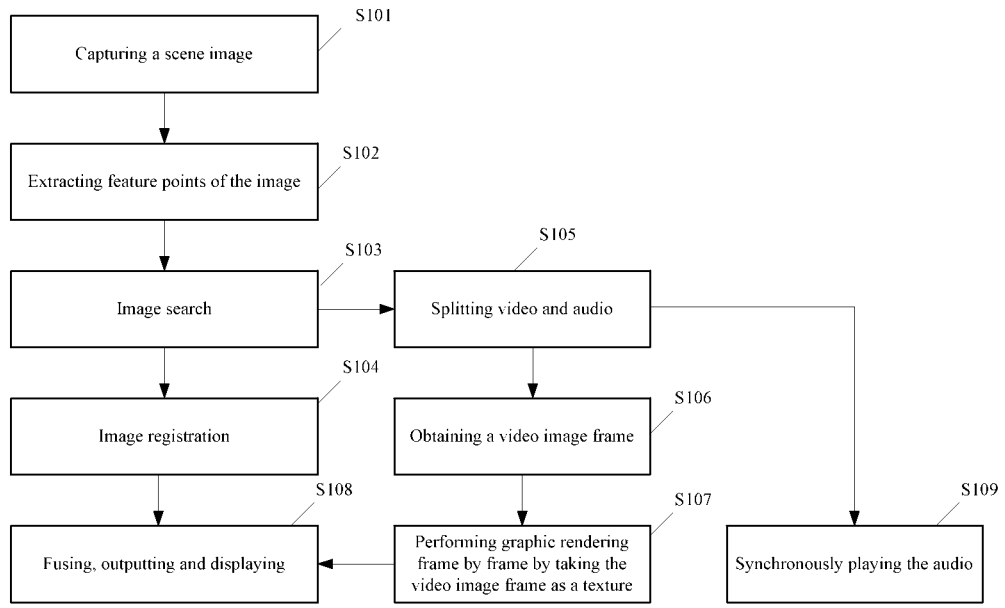
FIG. 3 is a flow chart of a method for playing video based on augmented reality technology according to embodiment 3 of the present disclosure.

FIG. 3 is a flow chart of a method for playing video based on augmented reality technology according to the present embodiment of the present disclosure. In the present embodiment, the method for playing video based on augmented reality technology comprises the following steps.

In step S101, a scene image is captured, i.e., a current scene image is captured by a video camera.

In step S102, feature points of the image are extracted, i.e., the features of image captured by the video camera are detected, the feature points of the image are extracted and described, the description vectors of the feature points are obtained, and thus the feature description data of the whole image are obtained.

In step S103, a image is searched, i.e., a reference image matching with the target picture of current scene images is searched in image database of a server according to the feature description data of the image captured by the video camera, and the reference image and corresponding video file are obtained. The corresponding video file obtained here can be understood as video resource identifier.

In step S104, the image is registered, i.e., the image captured by the video camera is registered with the reference image in a real-time and continuous manner according to a feature data of reference image returned by the image searching result, a posture of video camera is calculated, the homography matrix is obtained, and a rectangular plane 3D model which completely covers target picture in current scene image is drawn according to said homography matrix.

In step S105, the audio and video are separated, i.e., the video file obtained in step S103 is performed by audio-video split and decoding, and a video image frame sequence and an audio data are obtained. If the video resource identifier is searched in step S103, the related video should be found first according to the video resource identifier, and then the video is performed by audio-video split and decoding. Here, the video image frame sequence is also called as video stream.

In step S106, the video image frames are obtained, i.e., the video image frames are extracted from the video stream frame by frame.

In step S107, the video image frames extracted in step S106, as texture, are mapped to said 3D model frame by frame and are updated in real-time, and graphic rendering is performed.

In step S108, the current scene image captured by the video camera and a rendered 3D model are fused and output, and step S109 is performed simultaneously.

In step S109, the audio data are output synchronously, the video and audio are displayed in synchronization, and the video is "superposed" on a certain image area in real scene.

The effect of the present embodiment is also shown in FIG. 5. Since FIG. 5 is illustrated in detail in embodiment 1, the details of which are no longer repeated here. According to the present embodiment, the steps S101, S102, and S104 are all performed continuously during a whole video playing procedure, while step S103 is performed only once in principle during the video playing procedure, wherein the reference image matching with the image captured by the video camera module is searched by the image searching module, and after the reference image and the video resource corresponding to the reference image are found, the searching procedure will not be performed once again.

Embodiment 4

Figure 4:
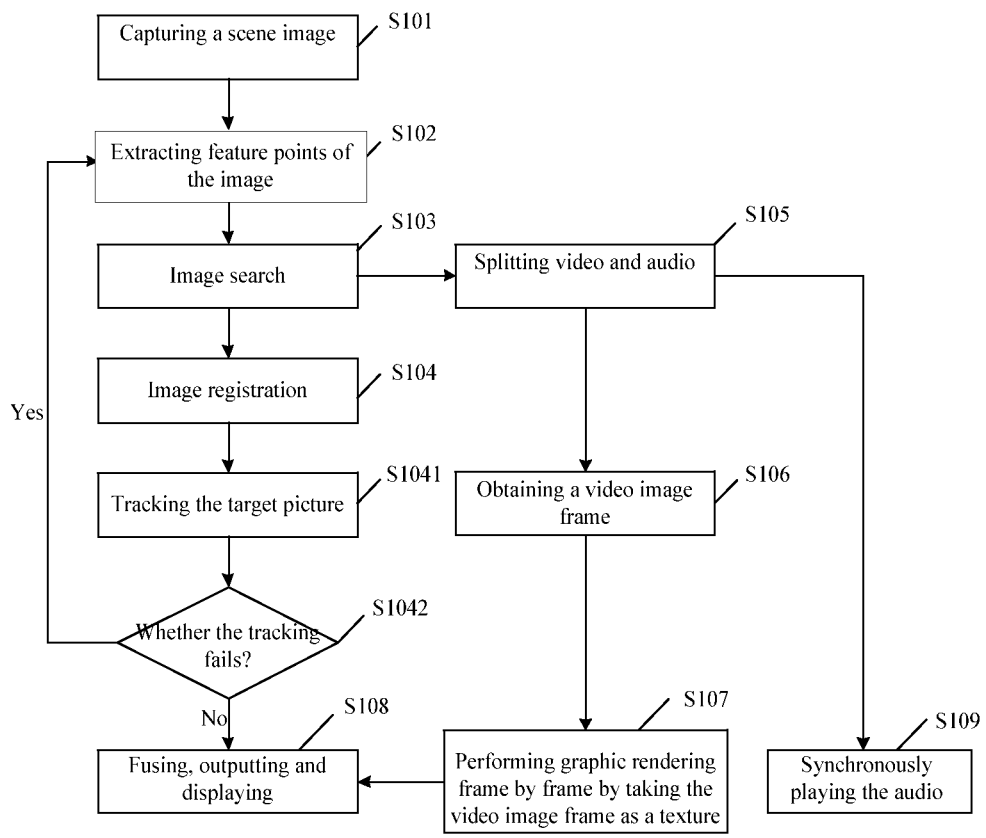
FIG. 4 is a flow chart of a method for playing video based on augmented reality technology according to embodiment 4 of the present disclosure.

FIG. 4 is a flow chart of a method for playing video based on augmented reality technology according to embodiment 4 of the present disclosure. In this embodiment, a target picture tracking step S1041 and a track failing determination step S1042 (FIG. 4) are added on the basis of the video playing method of FIG. 3 (that is, embodiment 3).

In step S1041, the target picture is tracked, i.e., when the image is successfully registered in step S104, the feature detection thereof would stop (i.e., step S102 is stopped). Instead, an optical flow tracking is performed on a target picture to obtain the homography matrix through tracking algorithm. With the tracking step S1041 performed, the homography matrix obtained in step S104 is an initial homography matrix, which is not used for drawing the 3D model directly, but for performing optical flow tracking on the target picture in combination with the feature points need to be tracked and the current scene image captured by the video camera in real-time, so as to obtain the homography matrix through tracking algorithm. The term "feature points need to be tracked" means the feature points of registered pictures during the image searching procedure.

In step S1042, whether the tracking fails is determined. The failing of tracking can be determined as follows: calculate once again the matching degree of the feature points which are successfully tracked, and record the number of the feature points thereof; if the number of the well-matched feature points is below a threshold (which ranges generally from 5 to 20, and is preferably 10), the tracking fails. When it is determined that the tracking fails, steps S102 and S104 are repeated, wherein feature detection and image registration are performed, and step S1041 is performed, i.e., the target picture is tracked (step S103 is performed in the same way as in the embodiment 3, i.e., step S103 is performed only once during a video playing process in principle).

According to the present embodiment, the system is added with the tracking step, and the speed of the system is improved compared with embodiment 3 since feature detection and registration on each frame picture is not needed. In addition, the judder of the images due to the minor deviation of the calculation result of the homography matrix during the registration process can be avoided, so that the 3D model formed therein is more stable in terms of visual effect.

In addition to the aforementioned video playing system and method, the present disclosure also provides a mobile terminal, which comprises a video playing system based on augmented reality technology. The picture information in newspapers and periodicals, magazines and other print media can be easily converted into video information, and the video completely fits the picture in the spatial position, so that a user can obtain a new audio-visual experience of combining emotion with scenery; and newspapers and periodicals, magazines and other paper media can also realize diversified propagation of information by virtue of the technology of the present invention, and provide a precise fast video push service.

All of the features, methods or steps disclosed herein, except for the features and/or steps which are conflict with each other, can be combined in any way.

Any feature disclosed in the description (including any appended claims, abstract and drawings) can be substituted by other alternative features having the same effect or similar purpose unless otherwise stated. That is to say, unless otherwise stated, any feature is just an example of a series of equivalent or similar features.

The present disclosure is not limited by the aforesaid embodiments. All of the new features disclosed herein and the new combinations thereof, as well as all of the new methods and steps disclosed herein and the new combinations thereof are within the protection scope of the present disclosure.

The invention claimed is:

1. A method for playing a video based on augmented reality technology, comprising:
   capturing, by the video camera, the current scene image containing the target picture;
   performing feature detection on the current scene image captured by the video camera, extracting image feature points thereof, and describing said image feature points, so as to obtain feature description data of a whole image;
   searching an image in an image database according to the feature description data of the current scene image, so as to obtain a reference image matching with the target picture in the current scene image and a video file corresponding to said reference image;
   performing audio-video split on and decoding to the video file corresponding to said reference image, in order to obtain a video image frame sequence and an audio data;
   registering the current scene image captured by a video camera with the reference image, calculating a posture of the video camera to obtain a homography matrix, and obtaining a rectangular plane 3D model which completely covers the target picture in the current scene image according to said homography matrix;
   mapping a video image frame, as a texture, in said video image frame sequence to said 3D model frame by frame, and performing graphic rendering; and
   fusing the current scene image captured by the video camera with the rendered 3D model, outputting and displaying the fusing result, and outputting said audio data synchronously.

2. The method according to claim 1, wherein registering the current scene image captured by a video camera and reference image, and calculating a posture of the video camera to obtain a homography matrix comprises:
   registering the current scene image captured by the video camera with the reference image in a real-time and continuous manner, and calculating a posture of the video camera, in order to obtain the homography matrix.

3. The method according to claim 1, wherein registering the current scene image captured by a video camera and reference image, and calculating a posture of the video camera to obtain a homography matrix comprises:
   registering the current scene image captured by the video camera with the reference image to obtain an initial homography matrix; and
   performing optical flow tracking on the target picture according to image feature points of successful image registration, the initial homography matrix and the current scene image captured by the video camera in real time, in order to obtain the homography matrix through tracking algorithm.

4. The method according to claim 3, wherein said method further comprises:
   determining whether the optical flow tracking on target picture fails,
   if yes, performing feature point detection and image registration once again on the current scene image captured by the video camera.

5. A system for playing a video based on augmented reality technology, comprising a video camera module, an image feature extracting module, an image searching module, an image registering module, an audio-video splitting and decoding module, an graphic rendering module, and an audio-video output module,
   wherein said video camera module is used for capturing a current scene image containing a target picture;
   wherein said image feature extracting module is used for performing feature point detection on the current scene image captured by the video camera module, extracting image feature points, and describing said image feature points, so as to obtain feature description data of the current scene image;

wherein said image searching module is used for receiving the feature description data of the current scene image from said image feature extracting module, searching in image database, transmitting the feature description data of a reference image matched therewith to the image registering module, and transmitting an Uniform Resource Identifier (URI) of a video resource corresponding to the matched reference image to the audio-video splitting and decoding module;

wherein said image registering module is used for registering the current scene image captured by the video camera module with the reference image according to feature description data of the reference image returned by the image searching module and the feature description data of the current scene image extracted by said image feature extracting module, so as to obtain a homography matrix;

wherein said audio-video splitting and decoding module is used for finding corresponding video file according to the URI of a video resource obtained by the image searching module, performing audio-video split on and decoding to said video file, in order to obtain a video image frame sequence and an audio data, and transmitting said video image frame sequence to the graphic rendering module and said audio data to the audio-video output module;

wherein said graphic rendering module is used for drawing a rectangular plane 3D model which completely covers the target picture in the current scene image according to the homography matrix calculated by the image registering module, and mapping a video image frame, as a texture, extracted by said audio-video splitting and decoding module to said 3D model frame by frame, thereby graphic rendering being performed; and wherein said audio-video output module is used for fusing the current scene image captured by the video camera module with the 3D model rendered by the graphic rendering module, outputting and displaying the fusing result, and outputting said audio data synchronously.

6. The system according to claim 5, wherein said image registering module registers the current scene image captured by the video camera module with the reference image in a real-time and continuous manner, and calculates a posture of the video camera module, in order to obtain the homography matrix.

7. The system according to claim 5, wherein said system further comprises a tracking module connected between said image registering module and said graphic rendering module, said tracking module being also connected with the video camera module, and wherein said tracking module is used for performing optical flow tracking on the target picture of the current scene image captured by the video camera module and calculating the homography matrix, after the target picture of the current scene image captured by the video camera module is successfully matched with the reference image.

8. The system according to claim 7, wherein said tracking module is also used for commanding image feature extracting module to detect feature points of the current scene image captured by the video camera module once again and commanding the image registering module to perform image registration once again when tracking on target picture fails.

9. A mobile terminal, comprising a video playing system based on augmented reality technology according to claim 5.

* * * * *